United States Patent
Wang et al.

(10) Patent No.: US 10,778,550 B2
(45) Date of Patent: Sep. 15, 2020

(54) PROGRAMMATICALLY DIAGNOSING A SOFTWARE DEFINED NETWORK

(71) Applicant: Nicira, Inc., Palo Alto, CA (US)

(72) Inventors: Su Wang, Sunnyvale, CA (US); Pankaj Thakkar, Cupertino, CA (US); Ganesan Chandrashekhar, Campbell, CA (US)

(73) Assignee: NICIRA, INC., Palo Alto, CA (US)

( * ) Notice: Subject to any disclaimer, the term of this patent is extended or adjusted under 35 U.S.C. 154(b) by 419 days.

(21) Appl. No.: 15/653,061

(22) Filed: Jul. 18, 2017

(65) Prior Publication Data
US 2019/0028372 A1    Jan. 24, 2019

(51) Int. Cl.
*H04L 12/26*    (2006.01)
*H04L 12/24*    (2006.01)

(52) U.S. Cl.
CPC ......... *H04L 43/0823* (2013.01); *H04L 41/06* (2013.01); *H04L 41/065* (2013.01); *H04L 41/069* (2013.01); *H04L 41/0677* (2013.01)

(58) Field of Classification Search
None
See application file for complete search history.

(56) References Cited

U.S. PATENT DOCUMENTS

| 2015/0331777 | A1* | 11/2015 | Lvin | H04L 41/065 |
| | | | | 707/694 |
| 2017/0093664 | A1* | 3/2017 | Lynam | H04L 43/0823 |
| 2017/0346859 | A1* | 11/2017 | MacFaden | G06F 9/45558 |

* cited by examiner

*Primary Examiner* — Younes Naji
(74) *Attorney, Agent, or Firm* — Adeli LLP (57) ABSTRACT

A method of diagnosing a software-defined network is provided. The method determines an observed plurality of network control events from a set of network control event messages. Each network control event message includes a unique identifier and is used for configuring a network configuration entity on a network component. The method, from a description of an expected configuration of the network, determines an expected plurality of network control events. The method backtraces the observed control events from the current configuration of the network to determine whether the expected network control events have occurred. The method identifies a network component as the source of fault when the network component receives an input set of network control events that matches a set of expected network events but does not produce a set of output network control events that match a set of network control events.

20 Claims, 10 Drawing Sheets

| | Network Configuration Entity Type 611 | Network Configuration Entity Unique Identifier 612 | Target Network Entity Type 613 | Target Network Entity Unique Identifier 614 | Target Network Entity Location 615 | Action 616 |
|---|---|---|---|---|---|---|
| 621 | Logical Network | LN_12 | MFE | MFE_132 | Host 1 | Configure the Entity |
| 622 | Logical Network | LN_12 | MFE | MFE_132 | Host 1 | Entity Configured |
| 623 | Logical Network | LN_12 | MFE | MFE_ATR4 | Host 2 | Configure the Entity |
| 624 | Logical Network | LN_12 | MFE | MFE_ATR4 | Host 2 | Entity Configured |
| 625 | Logical Router | LR_15 | Logical Network | LN_12 | MFE_132 on Host 1 | Configure the Entity |
| 626 | Logical Router | LR_15 | Logical Network | LN_12 | MFE_132 on Host 1 | Entity Configured |
| 627 | Logical Router | LR_15 | Logical Network | LN_12 | MFE_ATR4 on Host 2 | Configure the Entity |
| 628 | Logical Port | LP_A1 | Logical Router | LR_15 | LN_12 on Host 2 | Entity Configured |
| 629 | Logical Port | LP_A1 | Logical Router | LR_15 | LN_12 on Host 1 | Configure the Entity |
| 630 | Logical Port | LP_A1 | Logical Router | LR_15 | LN_12 on Host 1 | Entity Configured |
| 631 | Logical Port | LP_B6 | Logical Router | LR_15 | LN_12 on Host 2 | Configure the Entity |
| | ... | ... | ... | ... | ... | ... |

PROGRAMMATICALLY DIAGNOSING A SOFTWARE DEFINED NETWORK

BACKGROUND

A network virtualization platform is a platform that is used to configure and deploy networking topologies for a software-defined network. A virtualization platform is a complex product that includes many software components residing on different physical machines. For a simple network feature, often a number of components need to work collaboratively. As a result, it has become increasingly difficult for a single person to debug a network virtualization platform and find the culprit component when the configured network behaves incorrectly.

A problem often encountered by developers, testers, and field engineers in debugging a software-defined network is to quickly perform analysis and correctly identify the problem area when an issue is reported or a network feature does not work as expected. Traditionally, each network component developer strategically implements some log entries and may provide some cheat sheet to explain how to interpret those log entries during debugging sessions. This ad-hoc approach has several problems for the persons who perform overall system diagnosis for the software-defined network.

To effectively debug the software-defined network, one must have reasonable knowledge of all components that a network feature touches. Hence a bug may be punted around before the correct owner is discovered. Often times, it is just as hard to find the right developer than to resolve the bug itself. This overall knowledge of the software-defined network is transient and evolving. Products may change, log entries may change, and people may change. Searching and correlating messages in log files are a laborious process. Often in order to debug a problem, developers need to look through multiple log files, attempting to correlate to specific set of events.

BRIEF SUMMARY

Some embodiments provide a backtrace tool that generates a correlated view of network configuration entities across a software-defined network. The backtrace tool also programmatically diagnoses the configuration issues in the software-defined network. The backtrace tool retrieves log files that are created during the configuration of a set of network configuration entities. The backtrace tool then generates a network control message tree by using a set of schemas to parse the network control event messages stored in the log files.

The backtrace tool then identifies the network entities that were included in each network control event message. The backtrace tool then stores the information for the identified network entities. The backtrace tool utilizes the stored information for the network entities to provide a correlated view of a set of network entities in response to receiving queries that identify the set of network entities.

The backtrace tool also programmatically diagnoses the network issues after receiving a query to determine whether a desired network control event has occurred. The backtrace tool determines a group of observed network control events from a set of network control event messages. Each network control event message has a unique identifier and is used for configuring a network configuration entity on a network component. From a description of an expected configuration of the network, the backtrace tool determines an expected group of network control events. The backtrace tool then backtraces the observed group of network control events from the current configuration of the network to determine whether the expected group of network control events has occurred.

When there is a fault in the network configuration, the backtrace tool identifies a network component as the source of fault when the network component receives an input set of network control events that matches a set of network control events in the expected group of network control events but does not produce a set of output network control events that match a set of network control events in the expected group of network control events. When there is no fault in the network configuration, the backtrace tool generates a tree of network control events that cause the desired network configuration included in the query.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments provide a network backtrace tool that is used to quickly identify the problematic component(s)

when a problem occurs in a software-defined network. The tool provides correlated view of any network entity across the entire software-defined network. The tool also examines sequences of network control events and the interactions between network components to identify the cause of missing or erroneous events in the network. The tool identifies the missing or erroneous events and interaction for any network configuration outcome.

I. Network Backtrace Tool for Debugging a Software-Defined Network

Some embodiments provide a network-wide view of configured network entities. The tool also identifies the missing or erroneous events and interactions for any network configuration outcome. The functionality of the network components is typically defined at three logical levels of management plane, control plane, and data plane. The data plane handles the forwarding of the packets based on the rules defined by the control plane. The control plane maintains the configuration received from the management plane and from the network routing protocols. The management plane is used to interact with the user or administrator of the network.

In a software-defined network deployed by a virtualization platform, network configuration messages for defining network configuration entities generally flow from the management plane to the control plane and then to network entities in the data plane where actual traffic switching and routing takes place based on the network configurations. There is also a feedback mechanism amongst the management plane, control plane, and transport nodes. The configuration and the feedback interactions are referred to herein as network control events.

Figure 1:
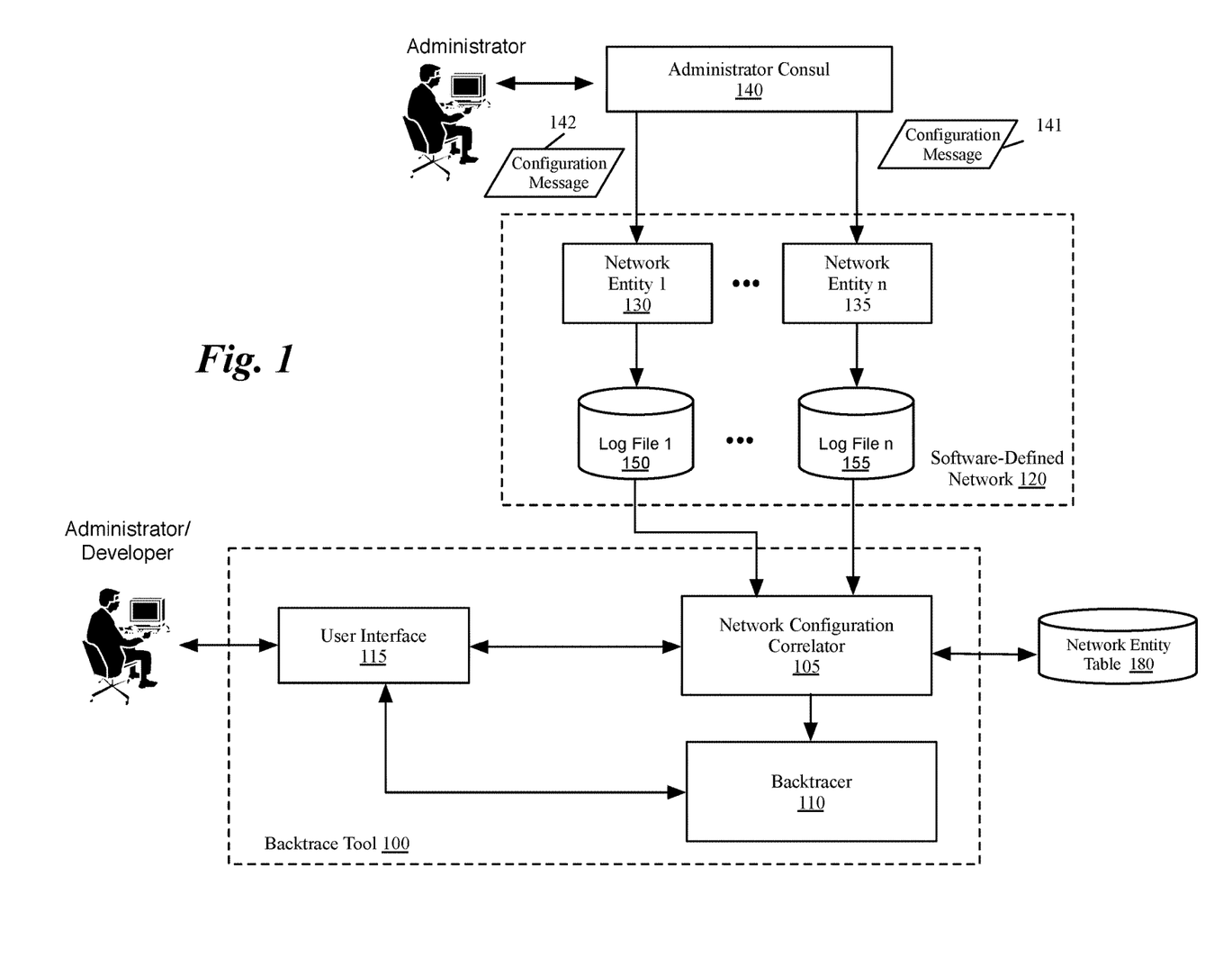
FIG. 1 conceptually illustrates a network backtrace tool utilized in a software-defined network in some embodiments.

FIG. 1 conceptually illustrates a network backtrace tool utilized in a software-defined network in some embodiments. As shown, the backtrace tool 100 includes a network configuration correlator 105, a backtracer 110, and a user interface 115. The software-defined network 120 includes several network entities 130-135.

The network entities 130-135 are physical or logical components of a network that move and manage packet traffic across the network. Examples of network entities include hardware entities such as transport nodes (virtualization software or hypervisors executing on host machines, edge nodes, etc.) and software abstracts such as logical routers, logical switches, etc. The network entities 130-135 also include virtualization software (e.g., hypervisors) and service nodes that are used to offload the packet processing from a software switch of the virtualization software.

Backtrace tool 100 provides a user interface 115 for communicating with a user such as a network administrator or a system developer. In some embodiments, the backtrace tool provides a command line interface (CLI) for communicating with the user. In other embodiments, the backtrace tool provides an application programming interface (API) that allows a programmatic interface with the backtrace tool.

The network configuration correlator 105 uses the contents of log files 150-155 to identify network configuration entities. The network configuration correlator stores the information about the network configuration entities extracted from the log files in a network entity table 180. The network configuration correlator uses the network entity table 180 to provide a correlated view of the network configuration entities across the entire network to the user interface 115.

A. Providing Correlated View of Network Entities

As shown in FIG. 1, the network entities 130-135 receive configuration messages 141-142 from a network administrator (e.g., through administrator consul 140). Each network entity performs the configuration request included in the configuration message. The network entities 130-135 also log the network control events (i.e., the configuration messages and an associated success or failure feedback) in the corresponding log files 150-155.

Figure 2A:
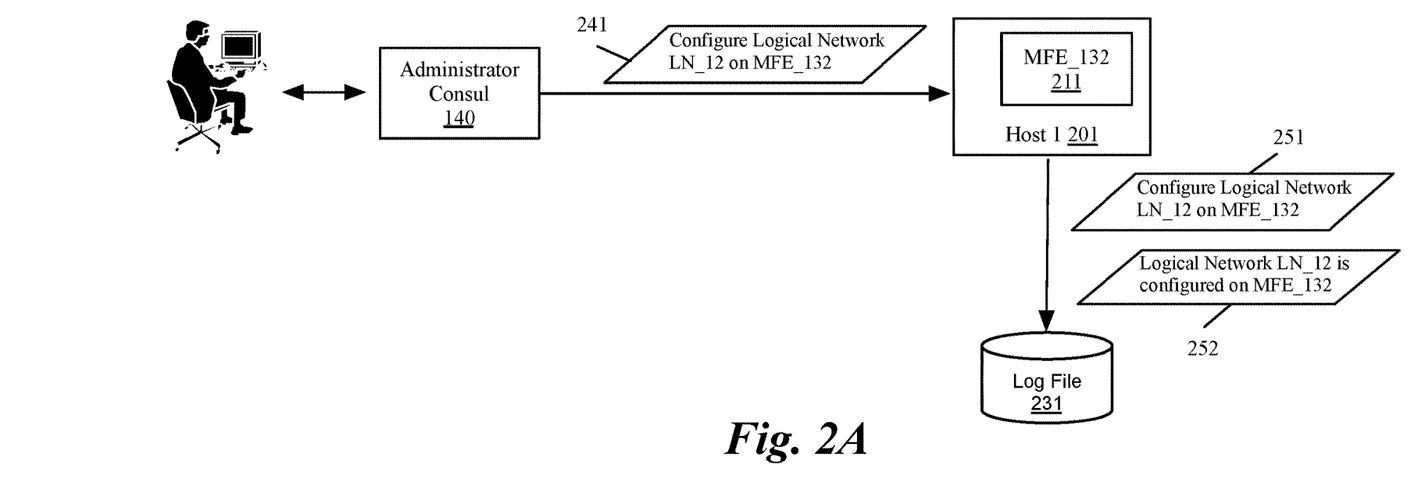
FIGS. 2A-2B conceptually illustrate network control events for configuring a logical network on a set of managed forwarding elements (MFEs) in some embodiments.
Figure 2B:
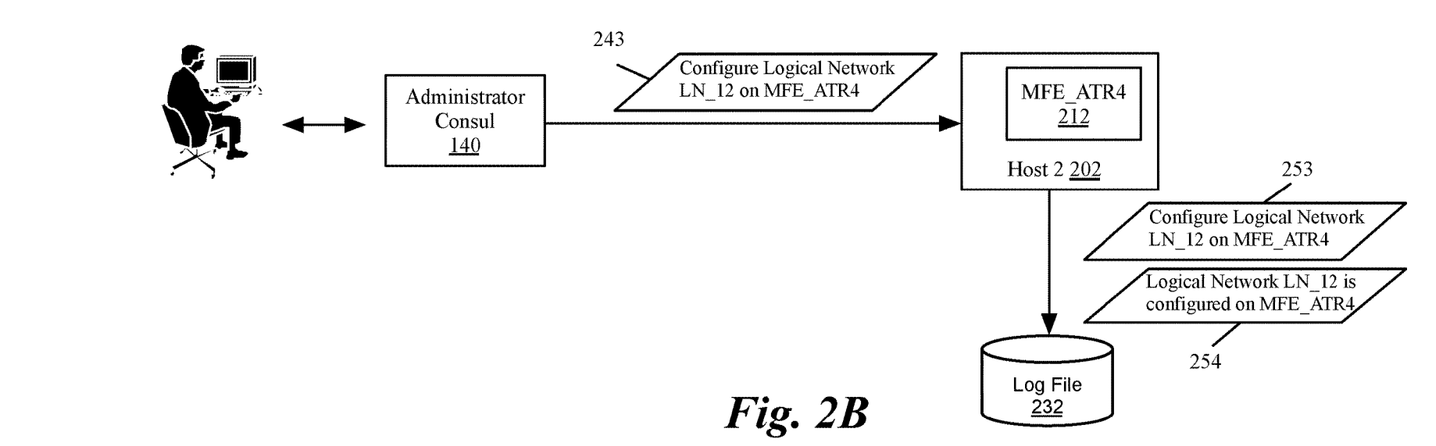

FIGS. 2A-2B conceptually illustrate network control events for configuring a logical network on a set of managed forwarding elements (MFEs) in some embodiments. The figures show network control events exchanged between the management plane (in this example the administrator consul 140) and a set of MFEs 211-212. Although the figures conceptually illustrate the messages 241-243 are exchanged between the administrator consul 140 to the MFEs 211-212, it should be understood that the messages are sent to the hosts 201-202 that include the MFEs, and are processed in order to configure the logical network on the MFE of the host. For instance, the configuration message in some embodiments is processed by a network manager agent (or daemon) that executes in the virtualization software of the host. The agent then performs the required operations to configure the logical network on the MFE of the corresponding host.

In the virtualization field, some refer to software switches as virtual switches since these are software elements. However, in this specification, the software forwarding elements are referred to as MFEs in order to distinguish them from logical forwarding elements (LFEs), which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

In some embodiments, an MFE on a host can be configured to logically forward data messages according to logical forwarding elements (e.g., logical switches, logical routers) configured by an administrator of the network to implement an LFE of a logical network. In some embodiments, the logical network is an abstract conception of a network generated by an administrator, and the logical network is implemented in a virtualized, distributed manner in a managed physical infrastructure (e.g., in a multi-tenant datacenter). That is, the virtual machines (VMs) that connect to the LFEs may reside on various different host machines within the network, and MFEs (e.g., software virtual switches) operating on these host machines implement some or all of the logical forwarding elements (logical switches, logical routers, etc.).

The administrator consul 140 sends a network configuration message to each of a set of hosts to configure a logical network on the host's MFE. The logical network is, for example, used by a datacenter tenant to connect the tenant's VMs. Each network configuration message identifies a network configuration entity (i.e., logical network LN_12) to be configured on an existing network entity (i.e., MFE_132).

As shown in FIG. 2A, the administrator consul sends a network configuration message 241 to the host 201 to configure logical network LN_12 on MFE_132 211. The host configures the logical network on the MFE. The host 201 also logs a copy 251 of the network configuration message and a feedback message 252 indicating that logical network LN_12 is successfully configured on MFE_132 in the log file 231. The host also includes the unique identifiers of the MFE and the logical network (in this example MFE_132 and LN_12) in the feedback message.

The administrator consul sends similar network configuration messages to other MFEs on other hosts to configure the same logical network. As shown in FIG. 2B, the administrator consul sends a network configuration message 243 to host 202 to configure the same logical network (i.e., logical network LN_12) on MFE_ATR4 212. The host 202 configures the logical network on MFE_ATR4 212.

The host 202 also logs a copy 253 of the network configuration message and a feedback message 254 indicating that the logical network LN_12 is successfully configured on MFE_ATR4 212 in the log file 232. The host 202 also includes the unique identifier of the MFE and the logical network (i.e., MFE_ATR4 and LN_12, respectively) in the feedback message.

Figure 3A:
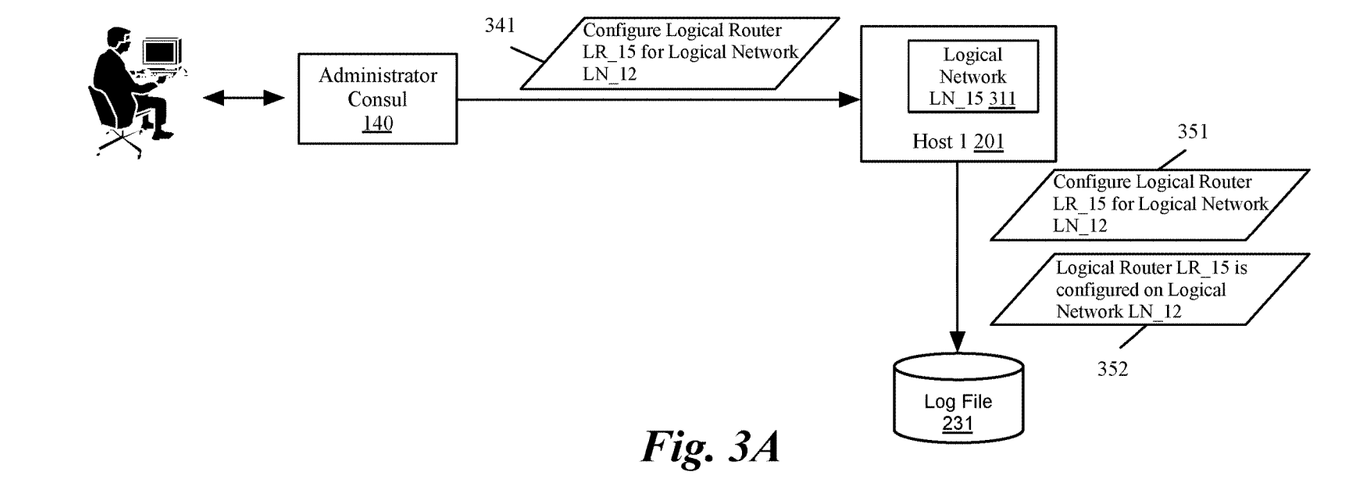
FIGS. 3A-3B conceptually illustrate network control events for configuring a logical router on the logical network that was configured in FIGS. 2A-2B.
Figure 3B:
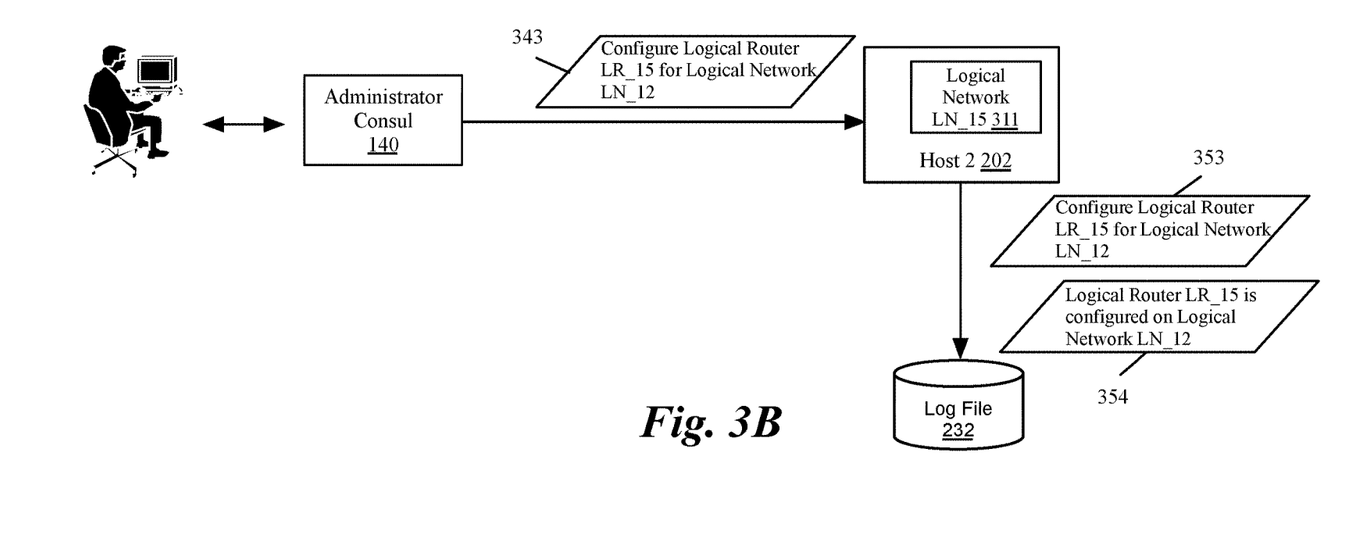

Once a network configuration entity such as logical network LN_12 in FIGS. 2A-2B is configured, the network configuration entity can be used in some embodiments as an existing network entity in order to configure further network configuration entities. FIGS. 3A-3B conceptually illustrate network control events for configuring a logical router on the logical network that was configured in FIGS. 2A-2B.

As shown in FIG. 3A, the administrator consul 140 sends a network configuration message 341 to host 201 to configure a logical router (logical router LR_15 in this example) on logical network LN_15 311. The host 201 configures logical router LR_15 on logical network 311. The host also logs a copy 351 of the network configuration message and a feedback message 352 indicating that the logical router is successfully configured on logical network LN_12 in the log file 231. The feedback message also includes the unique identifiers of the logical network and logical router (LN_12 and LR_15, respectively).

The administrator consul 140 sends similar network configuration messages to other hosts that include logical network 311 to configure the logical router. As shown in FIG. 3B, the administrator consul 140 sends a network configuration message 343 to host 202 to configure the same logical router (i.e., logical network LR_15) on logical network 311. The host 202 configures the logical router on logical network 311.

The host 202 also logs a copy 353 of the network configuration message and a feedback message 354 indicating that the logical router is successfully configured on logical network LN_12 in the log file 232. The feedback message also includes the unique identifiers of the logical network and logical router (LN_12 and LR_15, respectively).

A network configuration message is not always performed successfully. For instance, the configuration message may not be received by a network entity (or the host where a network entity resides) in order to configure a network configuration entity on an existing network entity. The configuration message may be received but the network configuration entity may not be properly configured due to different reasons such as lack of resources, misinterpretation of the configuration message, errors in the contents of the configuration message, etc.

Figure 4A:
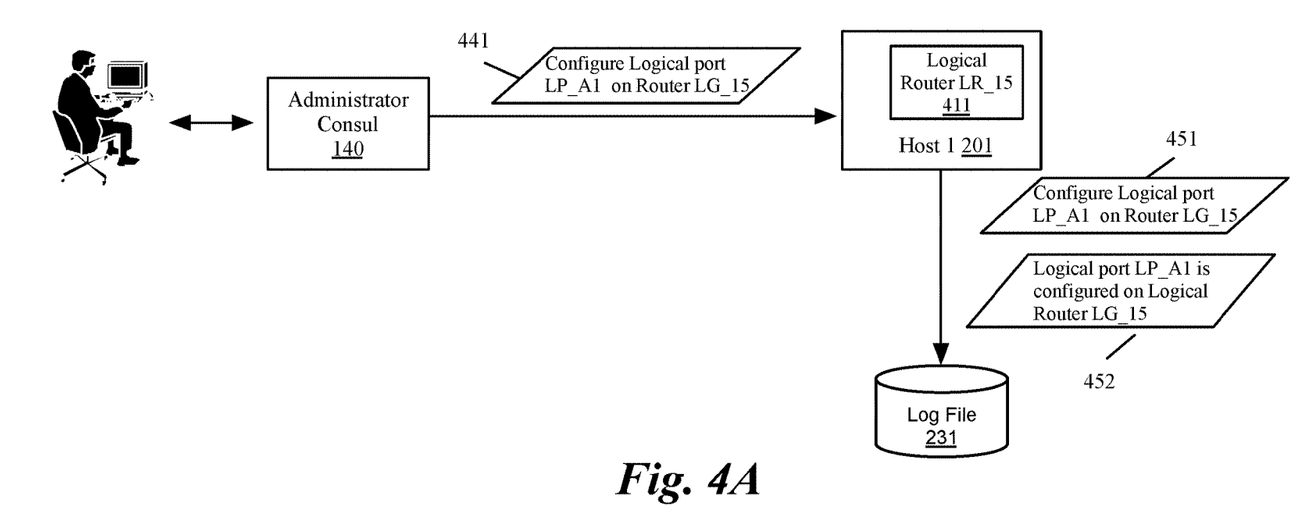
FIGS. 4A-4B conceptually illustrate network control events for configuring several ports on the logical router that was configured in FIGS. 3A-3B.
Figure 4B:
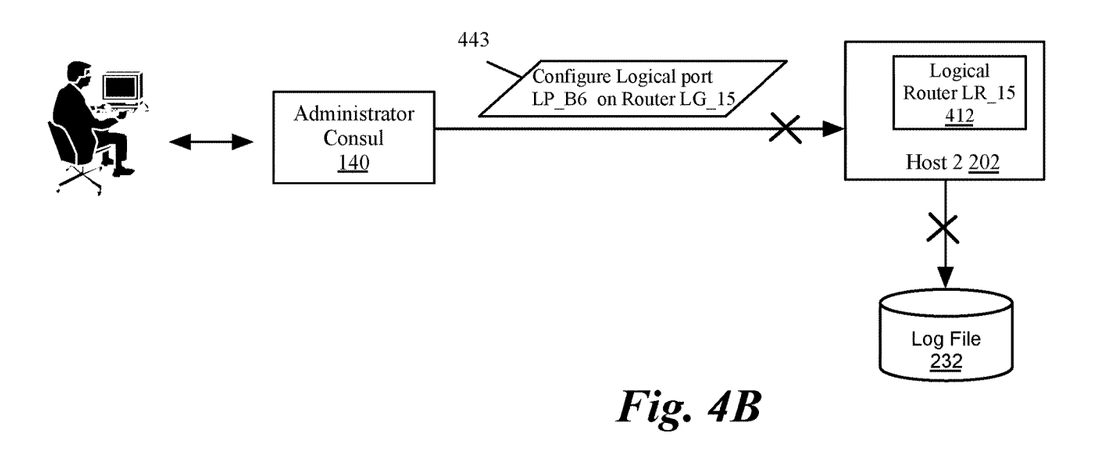

FIGS. 4A-4B conceptually illustrate network control events for configuring several ports on the logical router that was configured in FIGS. 3A-3B. As shown in FIG. 4A, the administrator consul 140 sends a network configuration message 441 to host 201 to configure logical port LP_A1 on a logical router LR_15 411. The host 201 configures logical port LP_A1 on logical router LR_15 411. The host also logs a copy 451 of the network configuration message and a feedback message 452 indicating that the logical port is successfully configured on logical router LR_15 in the log file 231. The feedback message also includes the unique identifiers of the logical router and logical port (LR_15 and LP_A1, respectively).

The administrator consul sends similar network configuration messages to other hosts that include logical router 411 to configure the logical router. As shown in FIG. 4B, the administrator consul sends a network configuration message 443 to host 202 to configure logical port LP_B6 on logical router LR_15. The host 202, however, is not able to configure logical port LP_B6 as requested in the configuration message 443 (e.g., the host does not receive the configuration message 443. As a result, the requested logical port is not created on the logical router 412 on host 202. As shown, no record of the configuration message 443 is stored in log file 232. As another example, the host 202 may receive the configuration message 443 but may not be able to create the requested logical port. As a result, the configuration message and a feedback message indicating the failure to create the logical port are stored in the log file 232.

Some embodiments utilize the contents of the log files in order to correlate network configuration entities across different the software-defined network. As described above, the network control event messages are saved in a set of log files. The backtrace tool collects network control event messages from the log files of the network and correlates the network configuration entities and the corresponding network components on which the network configuration entities are configured.

The backtrace tool cross-references the network configuration entities amongst the components and the other network configuration entities. This correlated view of the network entities identifies what network configurations are on each network component at a given time. This correlated view of the network allows a developer or an administrator to detect the missing or incorrect network configurations. The developer is relieved from having to search and correlate network control messages from many log files.

Figure 5:
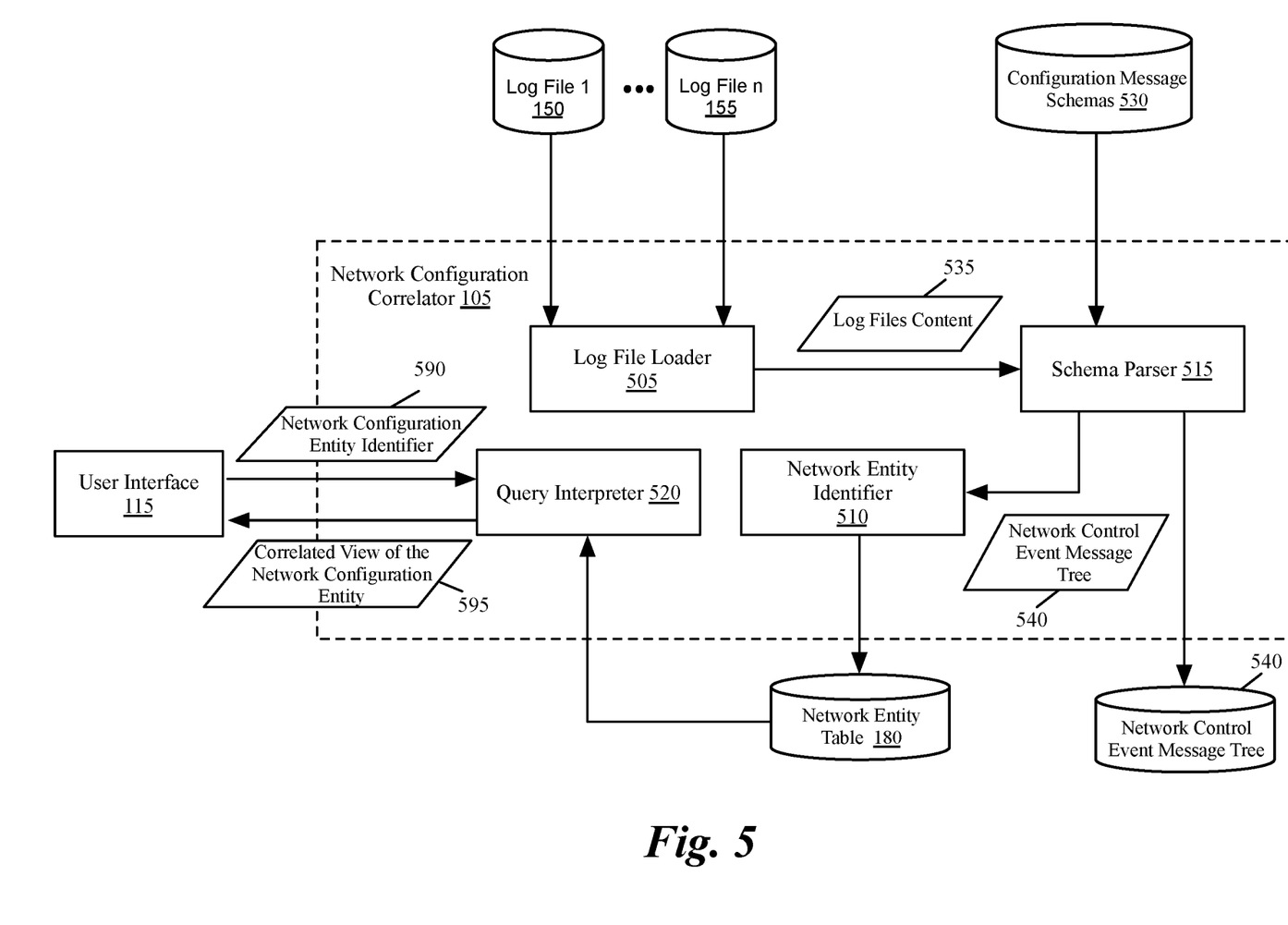
FIG. 5 conceptually illustrates components of the network configuration correlator of some embodiments.

The network configuration correlator 105 in FIG. 1 uses the contents of different log files 150-155 across the software-defined network 120 and correlates the network configuration entities across the network. FIG. 5 conceptually illustrates the components of the network configuration correlator of some embodiments. As shown, the network configuration correlator 105 components include log file loader 505, network entity identifier 510, schema parser 515, and query interpreter 520.

Log file loader 505 retrieves log files 150-155 generated by network entities. The log files are loaded from virtualization software, controller appliances, management appliances, etc. The log files include network control event messages (i.e., the network configuration messages and the corresponding feedback messages). The network control events in some embodiments are specified in an interface description language (IDL). An IDL describes an interface, such as an API, in a language independent format to enable communication between components that do not use the same language. An example of an IDL used in some embodiments is Protocol Buffers (Protobuf).

Protobuf messages are serialized into a binary format, which is not self-describing. Each Protobuf message type has a unique schema that is used to interpret the contents of the messages. The backtrace tool utilizes these schemas to interpret the corresponding control messages retrieved from the log files. The backtrace tool converts the event messages into network configuration entities such as logical router, logical switch, etc.

As shown, schema parser 515 receives the log files content 535 from log file loader 505. The schema parser utilizes the configuration message schemas 530 and parses network control events into a tree structure that maintains the content of each control message and the relationships amongst them. The configuration message schemas 530 are declarations that define the schemas for interpreting the configuration control event messages. The schema parser stores the network control event message tree in a data structure 540.

The network entity identifier 510 receives the network control event messages tree 540 generated by the schema parser 515 and identifies the network entities that were included in each network control event message. The network entities and their corresponding identifiers are stored in network entity table 180.

The network entity identifier 510 converts the network control messages into network configuration entities (e.g., logical routers, LFEs, etc.). Each network configuration entity has a unique entity identifier associated with it and the same entity can be cross-referenced on different network components (e.g., other network entities). For instance, in the example of FIGS. 2A-4B, the unique identifiers of MFEs 201 and 202 were MFE_132 and MFE_ATR4, respectively. Similarly, the unique identifier of the logical network 311 was LN_12, the unique identifier of logical router 411 was LR_15, and the unique identifier of ports configured on the logical router were LP_A1 and LP_B6.

The network entity table 180 includes one or more instances for each network configuration entity. Each instance identifies a complete configuration view of a network configuration entity on a network component at a given time instance. Each instance for a network configuration entity is the aggregation of all control messages with same entity identifier for that network entity, and on a particular network component. The same entity can, therefore, be cross-referenced on different software components, even if the network control messages (from different components) are completely different.

Figure 6:
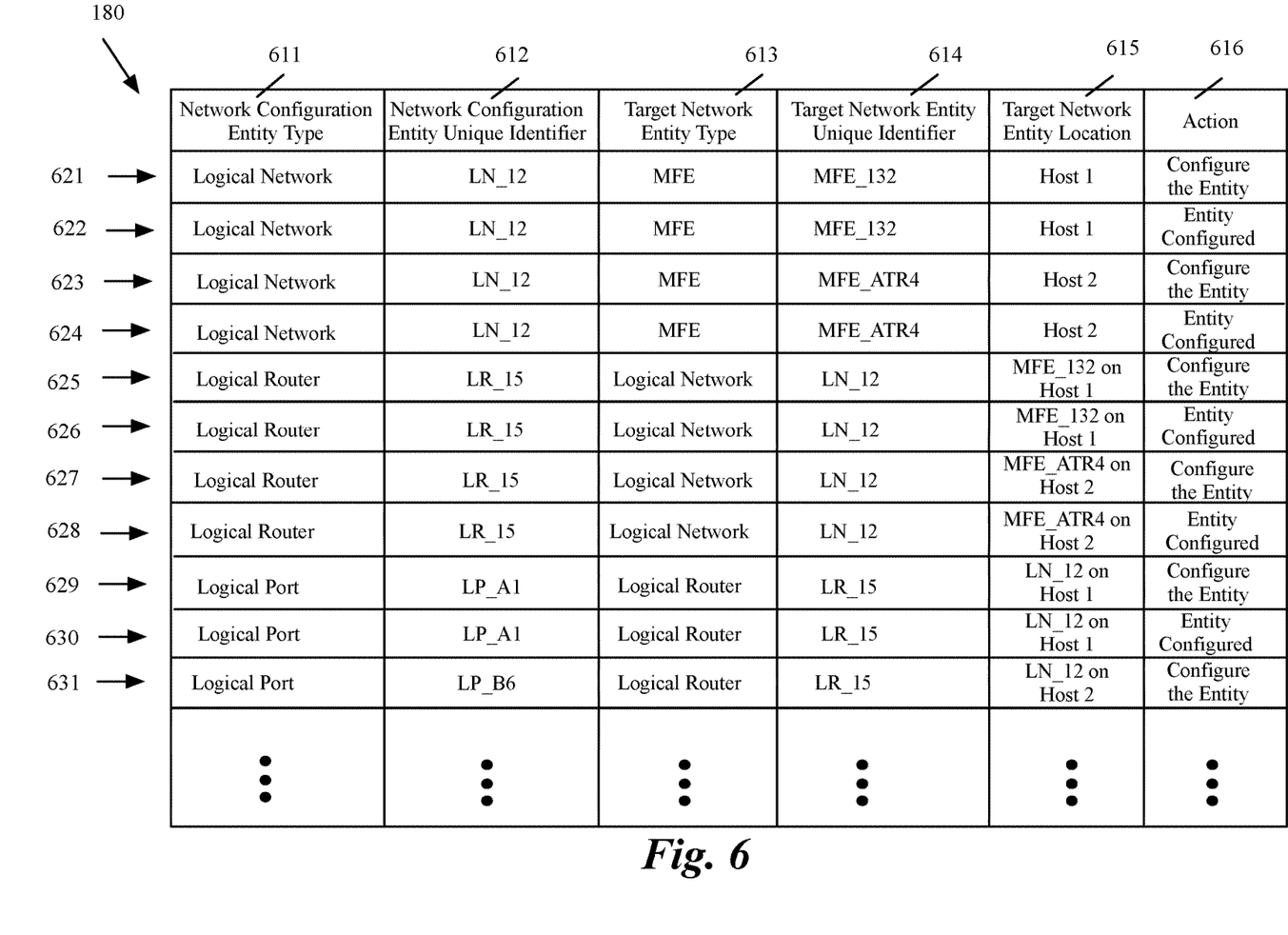
FIG. 6 illustrates an example of the correlated view of network configuration entity in some embodiments.

FIG. 6 illustrates an example of the correlated view of a network configuration entity in some embodiments. The figure shows a portion of the network entity table 180 that includes the correlated view of the network configuration entities of FIGS. 2A-4B. The table in this example includes the network configuration entity type 611, the network configuration entity unique identifier 612, the type of the target network entity (i.e., the network entity on which the configuration network entity is configured) 613, the target network entity unique identifier 614, the target network entity location 615, and the action 616 requested or performed for the network configuration entity.

Each row 621-631 shows an instance of a network configuration entity. For example, row 621 shows that a request to configure logical network LN_12 on MFE_132 was received at host 1. Row 622 shows that the logical network LN_12 was configured on MFE_132.

Row 623 shows that a request to configure logical network LN_12 on MFE_ATR4 is received on host 2. Row 624 shows that the logical network LN_12 was configured on MFE_132. Similarly, rows 625 and 627 show that requests to configure logical router LR_15 on logical network LN_12 was received at hosts 1 and host 2, respectively. Rows 626 and 628 show that logical router LR_15 was configured on logical network LN_12 on hosts 1 and 2, respectively.

Row 629 shows that a request to configure logical port LP_A1 on logical router LR_15 is received at host 1. Row 630 shows that logical port LP_A1 was configured on logical router LR_15. Row 631 shows that a request to configure logical port LP_B6 on logical router LR_15 is received at host 2. However, the table does not include a record of logical port LP_B6 being configured on logical router LR_15 on MFE_ATR4. As discussed above by reference to FIG. 4B, the host 2 was not able to configure logical port LP_B6 on logical router LR_15 on host 202. As a result, no record of this configuration message was logged at host 202.

Referring back to FIG. 5, a developer and an administrator can send queries through the user interface 115 to see a correlated view of one or more network entities. Each query includes the identifier 590 of one or more network configuration entities. The query interpreter 520 identifies the network configuration entities in the query and sends the correlated view 595 of the network configuration entity (or entities) back to the user through the user interface 115.

Since the backtrace tool utilizes schemas to interpret network control messages, any changes to the network control messages via schemas 530 are automatically reflected in network entities. The backtrace tool is, therefore, agnostic to the content of the control messages and requires no change when the schemas change. This allows the backtrace tool to adapt to changes in the network virtualization platform as the platform continues to evolve and network control messages are added, removed, or modified.

Figure 7:
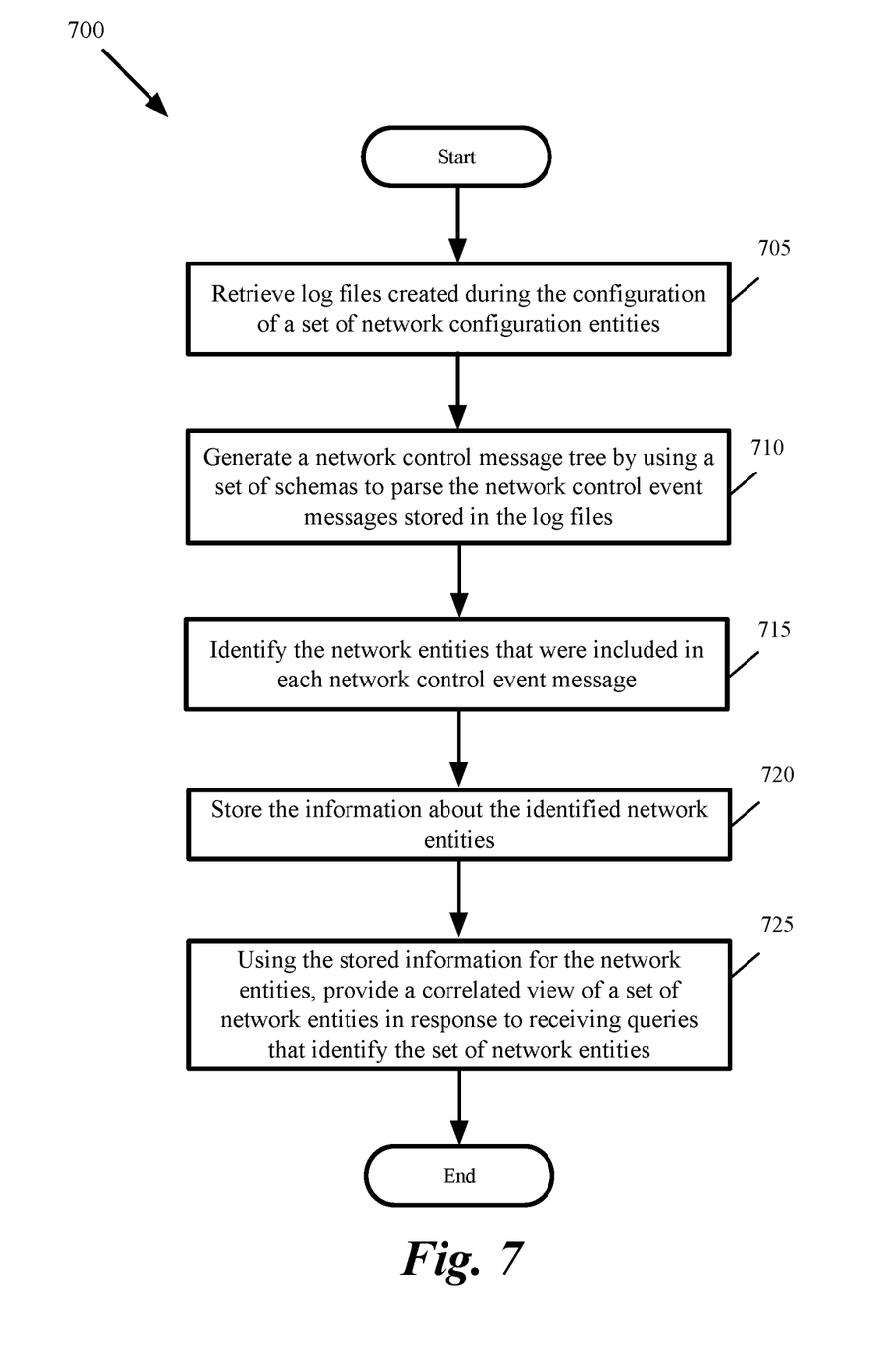
FIG. 7 conceptually illustrates a process for providing a correlated view of configured network entities in some embodiments.

FIG. 7 conceptually illustrates a process 700 for providing a correlated view of configured network entities in some embodiments. The process in some embodiments is performed by a network configuration correlator such as the network configuration correlator 105 in FIGS. 1 and 5.

As shown, the process retrieves (at 705) log files created during the configuration of a set of network configuration entities. For instance, the process retrieves log files 150-155 by the log file loader 505 shown in FIG. 5. The process then generates (at 710) a network control message tree by using a set of schemas to parse the network control event messages stored in the log files. For instance, the process parses the log file content 535 by schema parser 515 and generates the network control event message tree 540 shown in FIG. 5.

The process then identifies (at 715) the network entities that were included in each network control event message. For instance, the network entity identifier 510 receives the network control event messages tree 540 and identifies the network entities that were included in each network control event message as shown in FIG. 5. The process then stores (at 720) the information for the identified network entities. For instance, the network entity identifier 510 stores the information about the network entities as described above by reference to FIGS. 5 and 6.

The process then utilizes the stored information for the network entities to provide (at 725) a correlated view of a set of network entities in response to receiving queries that identifies the set of network entities. The process then ends.

B. Programmatically Diagnosing Network Configuration Problems

The network configuration correlator 105 component of the backtrace tool 100 aids a developer in debugging the software-defined network problems by collecting and correlating network configurations across the network entities. A developer can interpret these network configurations and use them to derive and correlate network control event(s) that have happened and eventually identify the problematic network components.

To achieve that, the developer must have a good understanding of the interactions of all components involved. This presents several challenges. For instance, few people know a continuously evolving software-defined system end-to-end. Also, as the number of network configuration events gets larger, scanning through them can be time consuming even if the events are correlated across components.

The backtrace tool in some embodiments backtraces network control events and identifies the root cause to faulty component(s) in the network. For any network configuration end result, there exists a deterministic sequence of control events and interactions that must take place prior to the end result to give cause to the network configuration end result. The backtrace tool identifies this sequence of network control events when the end result is achieved. The backtrace tool also identifies the missing or incorrect events and interactions (therefore identifying a problem component) when the end result is not achieved.

The backtrace tool uses the principle that on a network, for any event to happen, there must be a backtrace of events that links an observed event back to its root causes. For a given set of input network control events to a component, the output network control event from that component is deterministic. This output control event may then become an input control event of some other component. If a component has received all the required input control events, but fails to provide the expected output, this component is at fault.

A desired network configuration result may be viewed as a network configuration outcome, which depends on a collection of input network control events. If the outcome is not achieved, it must be because one or more of those input control events are missing or incorrect. Each of these missing or incorrect input control events themselves may also be viewed as a network outcome, which depends on some input control events and can be in turn traced. The backtrace tool identifies the culprit component(s) as the network entity (or entities) that has received all required input control events and has failed to produce correct output control event(s).

In order to correctly trace back a given network configuration result, the backtrace tool needs to know the dependencies of network control events (i.e., what output control events are produced by what input control events at what network component). The backtrace tool in some embodiments relies on developers to provide the dependencies of network control events.

In some embodiments, the backtrace tool uses a variation of the datalog database language, called nLog, to create a table for the expected network control events. Like datalog, nLog provides a few declaratory rules and operators that allow a developer to specify different operations that are to be performed upon the occurrence of different events. The declaratory rules and operations that are specified through nLog are then compiled into a much larger set of rules by an nLog compiler. In some embodiments, this compiler translates each rule that is meant to address an event into several sets of database join operations. Collectively, the larger set of rules forms the table mapping rules engine also referred to as the nLog engine.

The backtrace tool in some embodiments uses nLog as the language for the developers to specify control events dependencies. The nLog language allows the developers to state the network control interactions between the network components.

In some embodiments nLog uses the syntactic structure of Datalog rule declarations. For instance, nLog rule declarations are of the form "<head> :- <body1>, <body2>." The rule declaration "<head> :- <body1>, <body2>" can be understood as "<head> if it is known that <body1> and <body2>." The ":-" symbol demarcates the head from the body of a rule declaration. The text prior to the ":-" symbol is the head of a rule declaration. The text following the ":-" symbol is the body of a rule declaration. The head of the rule declaration receives parameters and defines the action that the rules engine will take when the conditions specified in the body clauses of the rule declaration are satisfied. It should be that the rule declarations do not have to be in this specific form. That is, any equivalent forms may be used to define these rule declarations.

Similar to the head of a rule declaration, the body contains actions and parameters. In the previous example, clauses <body1> and <body2> comprised the body of the rule declaration. A rule declaration may have one or several body clauses. For instance, "<head> :- <body1>" or "<head> :- <body1>, <body2>, <body3>". etc. Clauses in the body portion of a rule declaration are not used to create, modify, or destroy network constructs. Rather, in some embodiments, clauses in the body portion of a rule declaration are used as conditions for performing the action of the head portion of a rule declaration.

The head and body clauses of rule declarations can accept parameters. Parameters are inputs to the actions contained in either the head or the body clauses of rules declarations. For example, the parameters of a rule declaration that creates a new network construct typically indicate the location and identity of the new network construct to be created. A typical control events dependency rule using nLog is as follows:

derived_control_event_a (component_1, entity_id, attr_1, attr_2) :- derived_control_event_b (component_2, another_entity_id, entity_id, attr_1), derived_control_event_c (component_3, entity_id, attr_2, other_attr), observed_control_event_a (component_1, entity_id, attr_1, attr_2);

The above rule states that in order for the head statement's component "component_1" to generate control event "derived_control_event_a" for entity with "entity_id," the three body statements must have occurred. In other words, components "component_2," and "component_3" generating control events "derived_control_event_b" and "derived_control_event_c" involving entity "entity_id," must be satisfied. The last statement in the body, i.e., "observed_control_event_a", is an observation that "component_1" has generated control event "derived_control_event_a" for entity "entity_id."

The network control event "derived_control_event_a" may then be used in the body of some other dependencies. Similarly, the network control events "derived_control_event_b" and "derived_control_event_c" may be used as head of some rules, and may also be dependent on some other network control events. The observed event "observed_control_event_a" is generated from network entities in network entity table 180. These events are called observed control events because they are verifiable via network control event messages generated by the network components (e.g., as described above by reference to FIGS. 2A-6).

For any network configuration outcome, the backtrace tool forms a tree, which represents the sequence of control events that leads to this network outcome at the root of the tree. The leaves of the tree are observed control events. In order to answer to question how a desired network outcome is achieved, the backtrace tool constructs a dependency tree for that desired outcome based on the provided control events dependencies. If the tree cannot not be fully constructed, the backtrace tool identifies the missing branch that eventually leads to the missing observed control event and the culprit component that has failed to produce the correct output control event(s).

Figure 8:
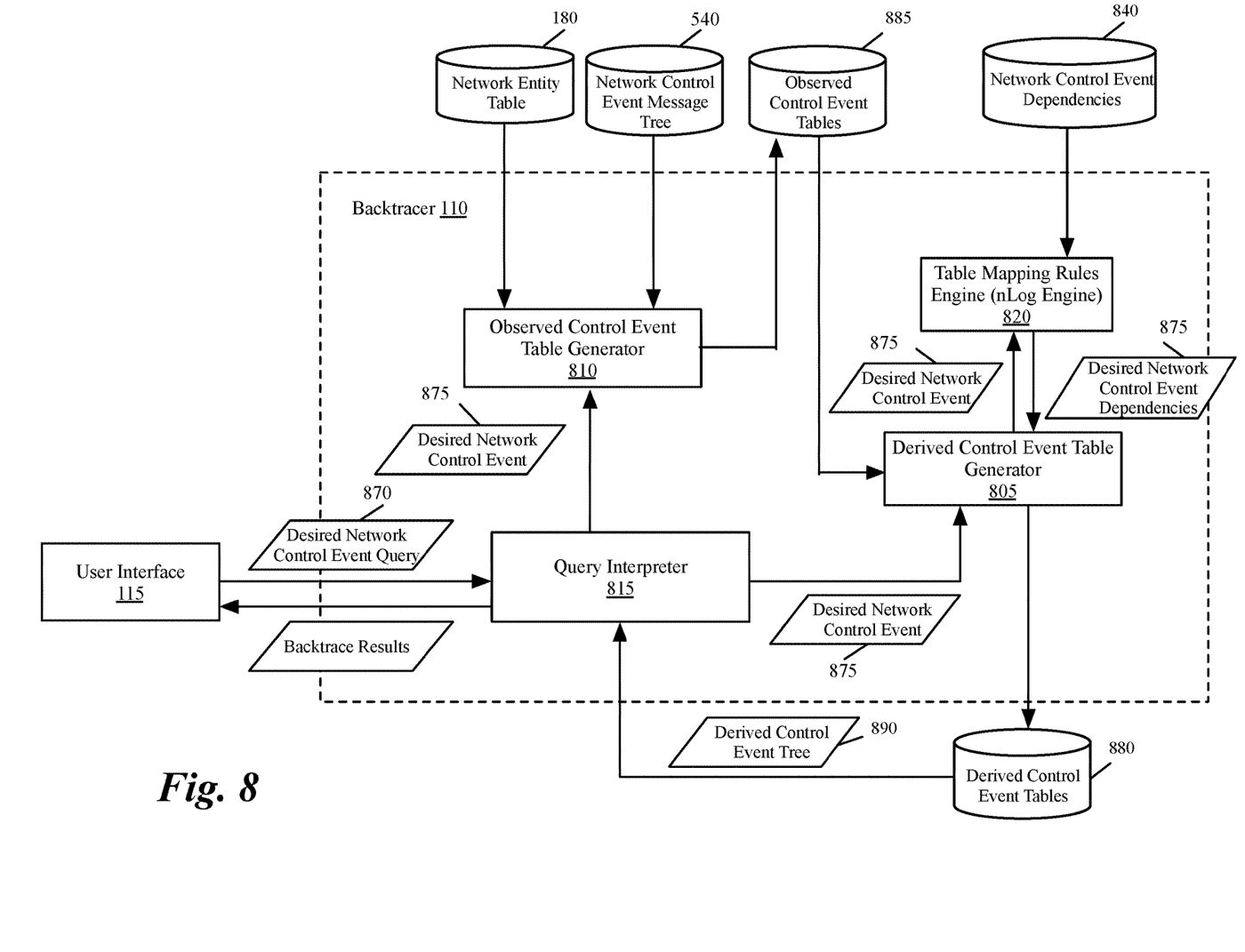
FIG. 8 conceptually illustrates the backtracer component of the backtrace tool of some embodiments.

FIG. 8 conceptually illustrates the backtracer component of the backtrace tool of some embodiments. As shown, the backtracer 110 includes a derived control event table generator 805, an observed control event table generator 810, a query interpreter 815, and a table mapping rules engine (or nLog Engine) 820.

The query interpreter receives a query 870 that includes a particular network control event as the desired network control event. The query interpreter 815 sends the desired network control event 875 to the observed control event table generator 810 and the derived control event table generator 805.

The observed control event table generator 810 generates the observed control event tables 885 based on network control event message tree 540 and the network entity table 180. Each observed control event table corresponds to a unique network control event message. The observed control event tables are populated with network entities in the network entity table 180. The observed control event tables include all the observed network control events known to the backtrace tool.

The derived control event table generator 805 uses the network control event dependencies 840 and the desired network control event 870 to generate the derived control event tables 880 for the desired network control events. The network control event dependencies 840 are the control event dependencies that the developers specify by using nLog language. The control event dependencies may be viewed as the formal documentation of component interactions for each network feature.

As shown, the derived control event table generator 805 sends each desired network control event 875 to the table mapping rules engine 820 and receives the desired network control event dependencies 875 from the table mapping rules engine 820. The derived control event tables 880 are created based on control event dependencies 840 specified by developers. Each derived control event table is dependent on one or more observed and other derived control event tables.

Each row in an observed control event table 885 represents an observed control event. Each row in a derived control event table 880 represents a derived control event. Each control event table implements a get row( )method that, given a set of attributes, returns the rows that satisfies those attributes. In case of the derived control event table, if the input attributes represent a network configuration outcome, the get row( ) returns the backtrace of that network configuration outcome.

Each derived control event table 880 represents a derived network control event type, for instance, a controller sending out logical router port configuration to a transport node. The derived control event table generator 805 implements a get row( )method, which takes queried network outcomes as input and returns on success all rows in the table that match these attributes. Each of these rows presents a network control event or outcome that satisfies the query. The derived control event table generator 805 then uses each of these (parent) rows or control events as input attributes and calls get row( )methods of each of the depending tables to retrieve the control events that cause this (parent) row/control event to occur. The process continues until all rows returned are observed events, or a particular get row( ) call fails to return at least one row. The end result is that on success, get row( ) returns a tree of control events that causes queried network outcomes. On failure, get row( ) returns an observed control event table that cannot satisfy queried network outcomes, and a sequence of control events that should have happened if this observed control event is found. This sequence of controlled events is the backtrace to the failure.

The query interpreter 815 converts network outcome to input parameters (i.e., the desired network control event 875) of the derived control event table generator 805. The query interpreter 815 interprets and presents backtrace results (the derived control event tree 890) stored by control event table generator 805 in the derived control event tables 880.

Figure 9:
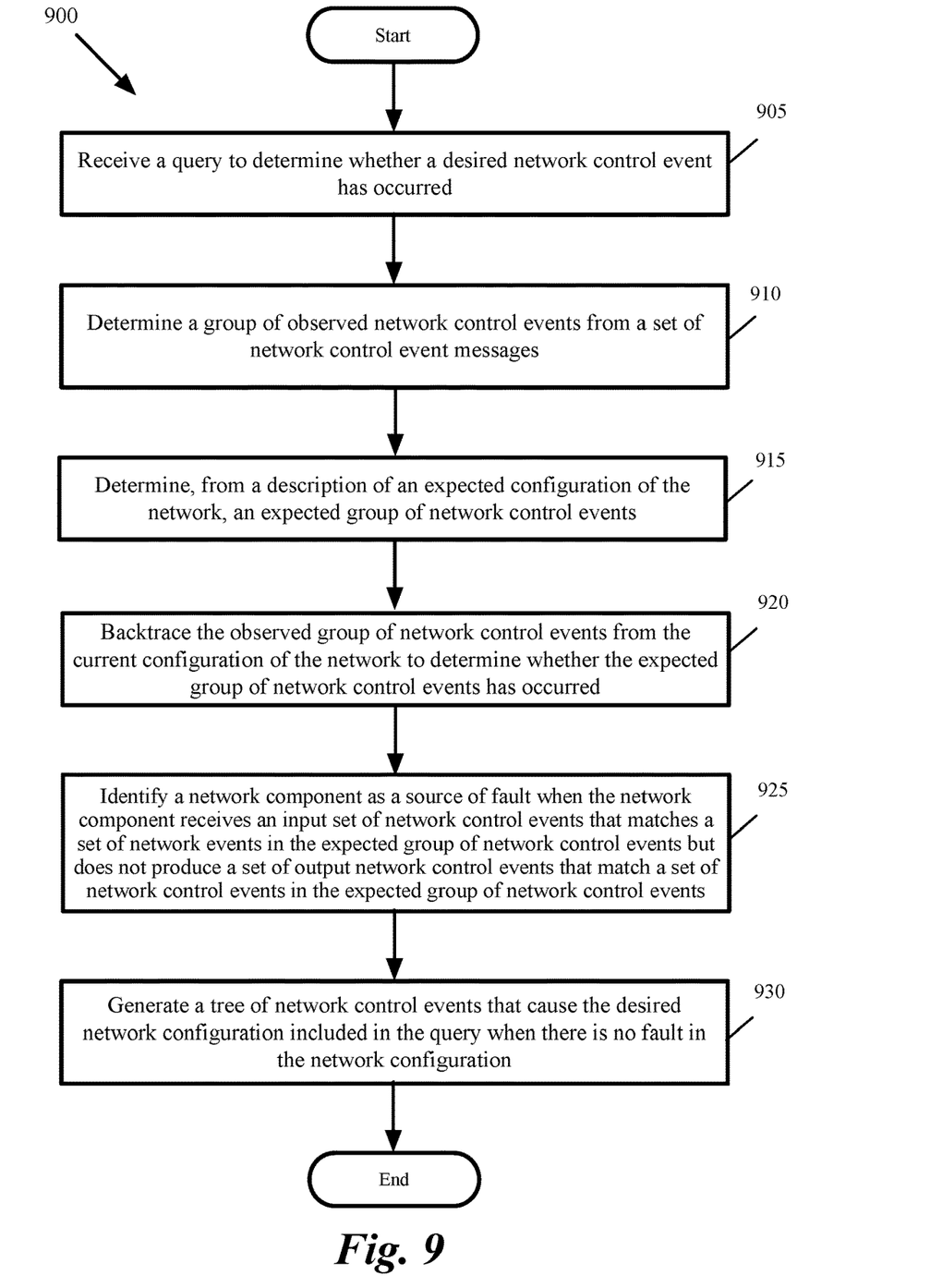
FIG. 9 conceptually illustrates a process for programmatically diagnosing network issues in some embodiments.

FIG. 9 conceptually illustrates a process 900 for programmatically diagnosing network issues in some embodiments. The process in some embodiments is performed by a backtracer component of the backtrace tool such as the backtracer 110 in FIGS. 1 and 8.

As shown, the process receives (at 905) a query to determine whether a desired network control event has occurred. For instance, the process receives the desired network control event query 870 by the query interpreter 815 in FIG. 8. Next, the process determines (at 910) a group of observed network control events from a set of network control event messages. For instance, the process determines the observed control event tables 885 by the observed control event table generator shown in FIG. 8. Each network control event message has a unique identifier and is used for configuring a network configuration entity on a network component.

The process then determines (at 915), from a description of an expected configuration of the network, an expected group of network control events. For instance, the process determines the derived control event tables (880) by the derived control event table generator 805 using the network control event dependencies 840 as described above by reference to FIG. 8.

The process then backtraces (at 920) the observed group of network control events from the current configuration of the network to determine whether the expected group of network control events has occurred. For instance, the process backtraces the derived control event tree 890 by the query interpreter 815 as described above by reference to FIG. 8.

The process identifies (at 925) a network component as a source of fault when the network component receives an input set of network control events that matches a set of network control events in the expected group of network control events but does not produce a set of output network control events that match a set of network control events in the expected group of network control events.

The process generates a tree of network control events that cause the desired network configuration included in the query when there is no fault in the network configuration. The process then ends.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
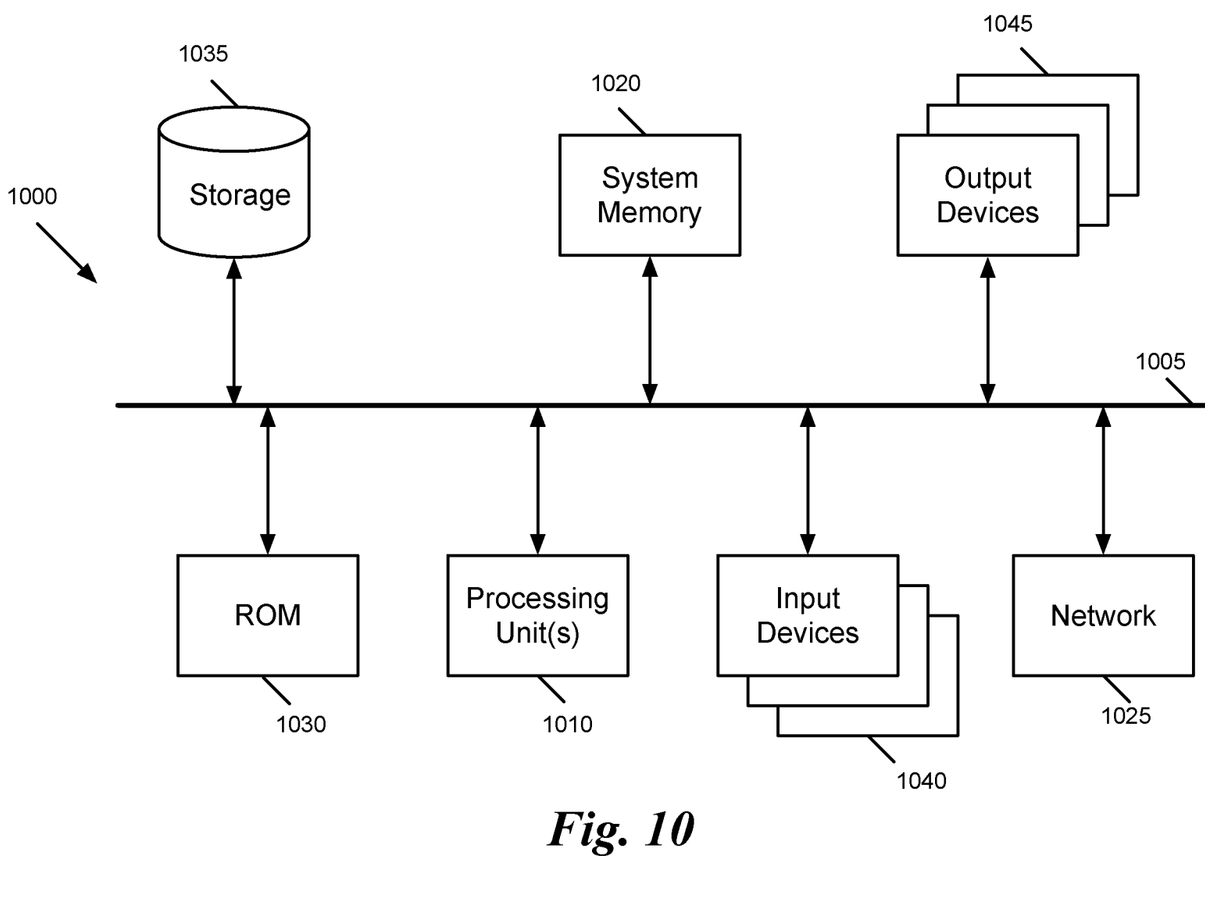
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., desktop computer, personal computer, tablet computer, server computer, mainframe, blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1020, a read-only memory (ROM) 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1020, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1020 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1020, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices, such as a touchscreen, that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), an Intranet, or a network of networks, such as the Internet. Any or all components of electronic system 1000 may be used in conjunction with the invention.

Some embodiments include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 7 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of diagnosing a software-defined network, the method comprising:
   determining an observed plurality of network control events associated with a set of network control event messages, each network control event message for configuring a network configuration entity on a network component, each network configuration entity comprising a unique identifier;
   for a network configuration outcome that is being diagnosed, generating a network control event dependency tree from the network configuration outcome based on a description of dependencies of network control events;
   using the network control event dependency tree to perform a backtracing operation on the observed plurality of network control events to determine whether events from the network control event dependency tree have occurred; and
   identifying a network component as a source of fault when the network component receives an input set of network control events that matches a set of network events in the network control event dependency tree and does not produce an output set of network control events that match a set of network control events in the network control event dependency tree.

2. The method of claim 1 further comprising receiving, prior to generating the network control event dependency tree, a description of dependencies of the network control events for each expected configuration of the network.

3. The method of claim 1, wherein determining the observed plurality of network control events associated with the set of network control event messages comprises:
   retrieving a set of log files generated by a plurality of network components; and extracting the set of network control messages from the retrieved log files.

4. The method of claim 3, wherein each network control message comprises a network configuration message requesting to configure a network configuration entity on a network component.

5. The method of claim 1 further comprising:
   identifying the network component and the network configuration entity to be configured on the network component from each network control event message; and
   correlating each network configuration entity to a set of network components using the unique identifier of the network configuration entity to create a network control event message tree, wherein the observed plurality of network control events is determined from the network control event message tree.

6. The method of claim 1, wherein the set of network control event messages are written in a non-descriptive language requiring a schema to interpret, the method further comprising:
   parsing each network control event using a corresponding schema to generate a network control event message tree;
   identifying a set of network configuration entities and a set of network components from the network control event message tree.

7. The method of claim 6 further comprising:
   generating a network entity table correlating each network configuration entity to one or more network components, wherein determining an observed plurality of network control events from a set of network control event messages comprises using one or more network configuration entities and one or more network components from the network entity table.

8. A non-transitory computer readable medium storing a program for diagnosing a software-defined network, the program executable by a processing unit, the program comprising sets of instructions for:
   determining an observed plurality of network control events associated with a set of network control event messages, each network control event message for configuring a network configuration entity on a network component, each network configuration entity comprising a unique identifier;
   generating, for a network configuration outcome that is being diagnosed, a network control event dependency tree from the network configuration outcome based on a description of dependencies of network control events;

using the network control event dependency tree to perform a backtracing operation on the observed plurality of network control events from the network control event dependency tree have occurred; and identifying a network component as a source of fault when the network component receives an input set of network control events that matches a set of network control events in the network control event dependency tree and does not produce an output set of network control events that match a set of network control events in the network control event dependency tree.

9. The non-transitory computer readable medium of claim 8, the program further comprising sets of instructions for receiving, prior to generating the network control event dependency tree, a description of dependencies of the network control events for each expected configuration of the network.

10. The non-transitory computer readable medium of claim 8, wherein the set of instructions for determining the observed plurality of network control events associated with the set of network control event messages comprises sets of instructions for: retrieving a set of log files generated by a plurality of network components; and extracting the set of network control messages from the retrieved log files.

11. The non-transitory computer readable medium of claim 10, wherein each network control message comprises a network configuration message requesting to configure a network configuration entity on a network component.

12. The non-transitory computer readable medium of claim 8, the program further comprising sets of instructions for:

identifying the network component and the network configuration entity to be configured on the network component from each network control event message; and correlating each network configuration entity to a set of network components using the unique identifier of the network configuration entity to create a network control event message tree, wherein the observed plurality of network control events is determined from the network control event message tree.

13. The non-transitory computer readable medium of claim 8, wherein the set of network control event messages are written in a non-descriptive language requiring a schema to interpret, the program further comprising sets of instructions for: parsing each network control event using a corresponding schema to generate a network control event message tree: identifying a set of network configuration entities and a set of network components from the network control event message tree.

14. The non-transitory computer readable medium of claim 13, the program further comprising a set of instructions for: generating a network entity table correlating each network configuration entity to one or more network components, wherein determining an observed plurality of network control events from a set of network control event messages comprises using one or more network configuration entities and one or more network components from the network entity table.

15. A system comprising:
a set of processing unit; and
a non-transitory computer readable medium storing a program for diagnosing a software-defined network, the program executable by one of the processing units, the program comprising sets of instructions for:

determining an observed plurality of network control events associated with a set of network control event messages, each network control event message for configuring a network configuration entity on a network component, each network configuration entity comprising a unique identifier;

generating, for a network configuration outcome that is being diagnosed, a network control event dependency tree from the network configuration outcome based on a description of dependencies of network control events;

using the network control event dependency tree to perform a backtracing operation on the observed plurality of network control events to determine whether events from the network control event dependency tree have occurred; and identifying a network component as a source of fault when the network component receives an input set of network control events that matches a set of network control events in the network control event dependency tree and does not produce an output set of network control events that match a set of network control events in the network control event dependency tree.

16. The system of claim 15, wherein the set of instructions for generating the network control event dependency tree comprises sets of instructions for:

receiving a description of dependencies of the network control events for each expected configuration of the network; and generating the network control event dependency tree based on the description of dependencies of the network control events.

17. The system of claim 15, wherein the set of instructions for determining the observed plurality of network control events associated with the set of network control event messages comprises sets of instructions for: retrieving a set of log files generated by a plurality of network components; and extracting the set of network control messages from the retrieved log files.

18. The system of claim 17, wherein each network control message comprises a network configuration message requesting to configure a network configuration entity on a network component.

19. The system of claim 15, the program further comprising sets of instructions for:

identifying the network component and the network configuration entity to be configured on the network component from each network control event message; and correlating each network configuration entity to a set of network components using the unique identifier of the network configuration entity to create a network control event message tree, wherein the observed plurality of network control events is determined from the network control event message tree.

20. The system of claim 15, wherein the set of network control event messages are written in a non-descriptive language requiring a schema to interpret, the program further comprising sets of instructions for:

parsing each network control event using a corresponding schema to generate a network control event message tree;

identifying a set of network configuration entities and a set of network components from the network control event message tree.

* * * * *